E. MAUNULA.
MOLDING MACHINE FOR LEADS OF NETS, &c.
APPLICATION FILED MAR. 16, 1914.
1,166,703.
Patented Jan. 4, 1916.
2 SHEETS—SHEET 1.
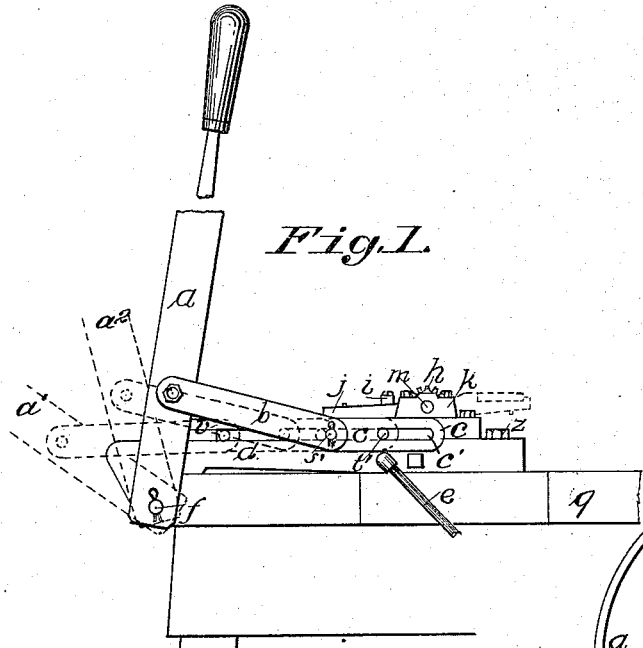
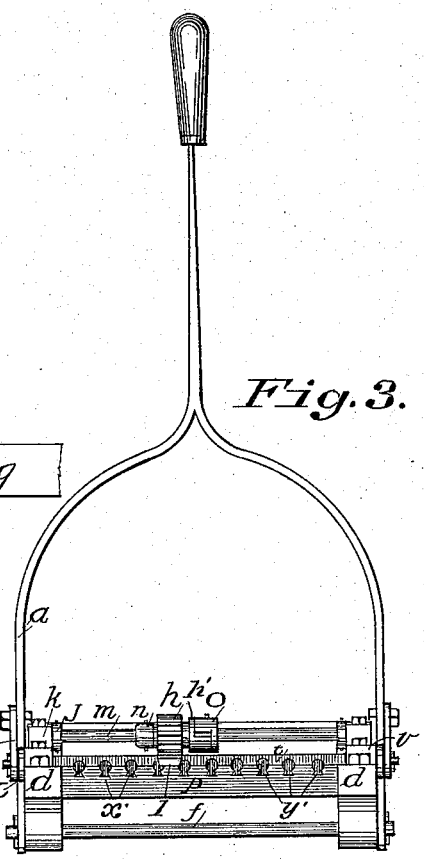
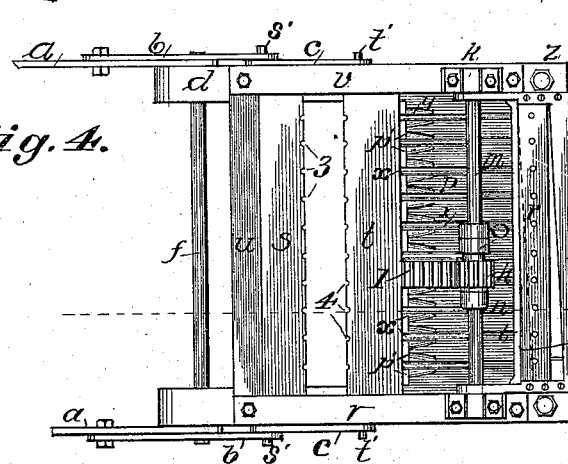
Witnesses.
Charles Rickles
Thos Eastberg
Inventor:
Erik Maunula.
By G. H. Strong.
atty

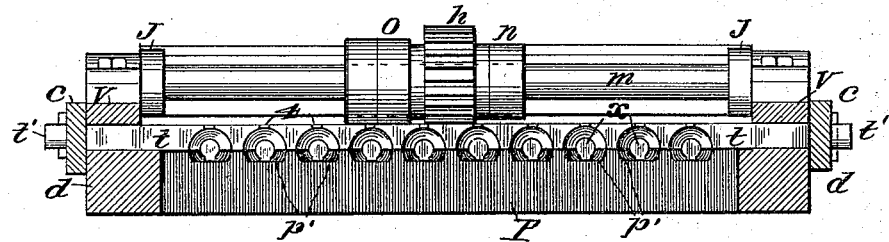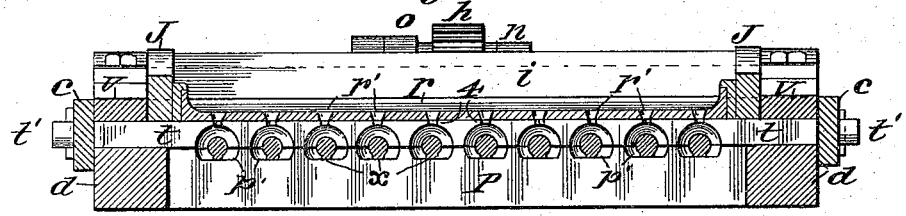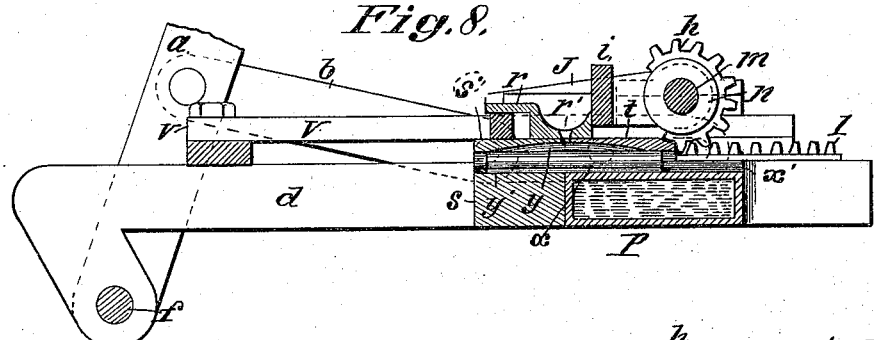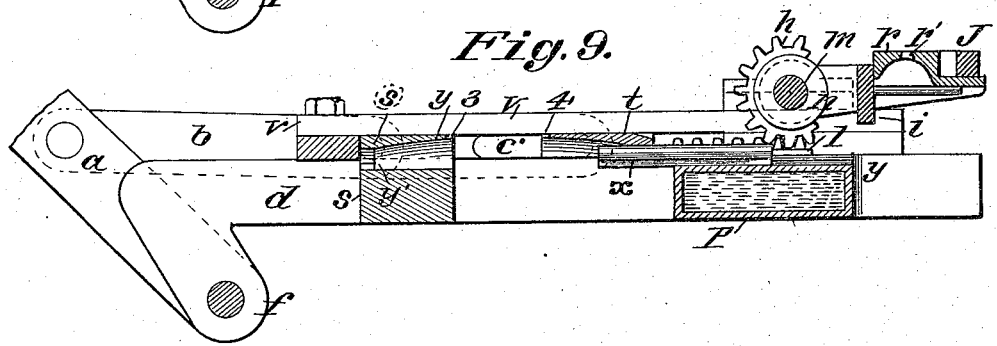

UNITED STATES PATENT OFFICE.

ERIK MAUNULA, OF ASTORIA, OREGON.

MOLDING-MACHINE FOR LEADS OF NETS, &c.

1,166,703.

Specification of Letters Patent.

Patented Jan. 4, 1916.

Application filed March 16, 1914. Serial No. 824,891.

*To all whom it may concern:*

Be it known that I, ERIK MAUNULA, a citizen of the United States, residing at Astoria, in the county of Clatsop and State of Oregon, have invented new and useful Improvements in Molding-Machines for Leads of Nets, &c., of which the following is a specification.

This invention relates to a casting or molding machine for the formation of hollow tubular leads or weights of the type applicable to fish nets, seines and other analogous purposes.

It is an object of the present invention to provide a machine wherein tubular split leads or weights for fish nets, seines and the like can be quickly cast in the desired shape and size in large numbers.

It is a further object of the invention to provide a casting or molding machine for producing tubular split molded bodies, the machine being provided with triple mold sections, with means for moving two of said sections with relation to a stationary section and to provide a cutter movably mounted upon one of the mold sections, one of which sections also forms a stripper for the cast bodies from the stationary section.

It is a particular object of the present invention to provide a casting or molding machine with core mold members and movable mold sections, the cores and movable mold sections coöperating to form an elongated arcuate chamber or matrix with a puller or bar member for producing in the cast piece a longitudinal slit.

It is a further object to provide a water-cooled molding machine.

The invention consists of a molding machine with a stationary mold or matrix-forming member and a plurality of matrix-forming sections, all coöperating to produce the desired matrix chamber, and further consists of a cutter movably connected to one of the mold members, and includes a single operating lever whereby the several movable elements of the machine are moved, means being provided for the timing of the movement of the several elements.

Figure 1 is a side elevation of the mold with the parts shown in the closed or cast position. Fig. 2 is a vertical section of the machine centrally through one of the mold chambers. Fig. 3 is a rear end view of the machine. Fig. 4 is a plan view of the machine with the mold sections in open position. Fig. 5 is a perspective of one of the mold leads. Fig. 6 is a transverse vertical section in open position. Fig. 7 is a transverse vertical section in closed position. Fig. 8 is a vertical, longitudinal section in closed position. Fig. 9 is a vertical, longitudinal section in open position.

In the drawing, $a$ is a handle or lever mounted upon a fulcrum rod $f$ which is journaled in forwardly extending arms or frame $d$, Fig. 2, which may be bolted or otherwise fastened to a suitable table or bench $g$. Above the fulcrum $f$ there is connected to the arms of the lever $a$ links $b$ which extend along the sides of the frame and connect to pivot pins $s'$ projecting from the ends of a mold or matrix section $s$, which is slidably mounted upon the frame arms $d$, and beneath guide rails $v$, suitably secured to the arms $d$. The slidable matrix section $s$ is provided with a number of parallel matrix chambers $y$, the inner portions of which are of larger diameter than the outer portions, the latter extending to the rear vertical face of the mold section $s$, and being formed with a flared or dove-tailed portion $y'$. The matrix chamber $y$ of the mold section $s$ forms approximately a chamber which in the instance shown is designed to produce a fish-net lead shown at 2, Fig. 5, the other part of the mold chamber for producing the lead being formed partly in an upper slidable mold section $t$, also movable between the arms $d$ and the upper guides $v$ and in the same plane with the complementary mold section $s$.

The slidable quarter mold section $t$ is provided with outwardly projecting pins $t'$ at its ends on which are mounted links $c$, one on each side of the frame, these being slotted at $c'$ to allow for an independent movement of the half mold section $s$ by the hand lever $a$ independently of the quarter mold $t$.

As clearly shown in Fig. 4, there is provided a lower quarter section or mold piece P, having a plurality of quarter matrices $p'$ which, in conjunction with the quarter matrix chambers of the upper section $t$ and the front section $s$ forms a complete matrix chamber of the desired shape.

It is desirable in the present invention to cast tubular, longitudinal, split leads 2 which may be applied at any time as desired by clipping over and being closed upon the fish-net strands. Accordingly there are provided in this case, and rigidly secured on the stationary mold section P, a plurality of center core rods or pins $x$, the diameters of which are to produce the desired size core in the receiving chamber in the lead 2, these pins being axially mounted in the matrix chambers, and of such length so that when the mold section $s$ is moved toward the stationary section P to the closed position, Fig. 2, the ends of the pins will project into the reduced outer ends $y'$ of the section $s$, and thus operate to close or plug the openings of the chamber $s$, and will at the same time form inner annular chambers for the reception of the molten lead. The lower portion of the core pins are longitudinally shaped to form a bar of the shape indicated by openings $x'$ of the mold section P, Fig. 3, the lower longitudinal, rigid portion of the bars, engaging the bottom of the respective matrix chambers, so as to form arcuate or longitudinal, split leads 2, of Fig. 2.

Secured to and projecting rearwardly from the upper mold section $t$ is a rack bar $l$ running beneath and engaging a pinion $h$, which is loose on the transversely extending shaft $m$, and turns between the collar $n$ and the clutch member $o$ which is fast on the shaft $m$, and is engaged and operated by a clutch member $h'$ on the pinion $h$. The clutch members $h'$ and $o$ are so proportioned and designed that the pinion may have some lost motion on its shaft $m$ before it operates to turnably engage the shaft clutch member $o$ as indicated by the space between $h'$ and $o$, Fig. 3.

On the shaft $m$ there is secured a frame J having a transversely extending bar $i$ toward, and from which there is movable a sprue or pouring trough $r$, which is provided with a plurality of sprue apertures $r'$ adapted to be brought into register with similar apertures formed by opposing semi-circular apertures 3 and 4 formed respectively in the coöperating adjacent edges of the mold sections $s$ and $t$, as shown in Figs. 2 and 4. The trough plate is movably mounted in the swinging frame J, and may move from the full line position, Fig. 4 to the dotted line position for purposes to be hereinafter described.

The operation of the machine is as follows: Assuming that it is desired to cast a multiplicity of the weights or leads 2 in the machine, the operator grasps the lever $a$ and throws the same forwardly over the machine, the first portion of its movement from position $a'$, Fig. 1, to position $a^2$ operating to shift the forward mold section $s$ toward the mold section $t$, Fig. 4; subsequent movement of the handle $a$ forces the mold section $s$ against section $t$, and these are moved uniformly together rearwardly, so that the rack $l$ will engage pinion $h$ and the clutch members $h'$ and $o$ being in abutment at this time, the pinion $h$ will revolve the shaft $m$, and this in turn carrying the frame or leaf J upwardly and forwardly over the center of the shaft $m$, whereupon the frame J may swing freely forward and assume a position in Fig. 1 over the mold sections $s$ and $t$ as they move into matrix forming position over the lower stationary quarter mold B, Fig. 2. When in this position the sprue holes $r'$ of the trough $r$ aline with the holes formed by the notches 3—4, forming sprue holes for the closed mold sections $s$ and $t$, and the operator may then pour molten material into the trough $r$ from which it will flow into the matrix chambers $y$.

Cold water may run through the chambered mold section P through means of a water supply pipe $e$ connected to the chambered mold P, and thus rapidly cool the mold members and increase the rapidity with which leads may be cast, because of the rapid cooling and hardening of the molten material. As soon as the leads have solidified in the mold the operator may then pull the handle outwardly from the machine, the initial motion through means of the links $b$ acting directly upon the mold section $s$, to move the latter away from the stationary mold section P, and when the links $c$ have been moved sufficiently so that the ends of the slots $c'$ will allow the initial movement of the mold section $s$ before any movement of the mold section $t$, then the pins $t'$ of the mold section $t$ will be engaged by the end walls of the links $c$, and the mold section $t$ will then be drawn forwardly as the handle is pulled back. Simultaneously with the forward movement of the mold section $t$ and its connected rack $l$ the pinion $h$ will through means of its clutch member $h'$ engage the coöperative clutch member $o$, and this will in turn revolve the shaft and serve to lift the trough, carrying frame J from position over the mold $t$, the latter during its forward movement away from the stationary section P forming an ejector serving to strip the cast leads 2 from their chambers and the core pins, and allow them to fall from the ends of the core pins. During the opening movement of the mold sections $s$ and $t$ the trough $r$ acts as a knife or cutter to sever the material in the sprue holes $r'$ from the weights 2 in the matrices, trough $r$ being allowed to have an independent movement in its frame J, so as to further facilitate the shearing off of the sprue material, as shown by dotted lines in Fig. 4.

Having thus described my invention, what I claim and desire to secure by Letters Patent is:

1. In a casting machine, the combination of coöperating mold sections, one of said sections forming a quarter of the mold chamber and including a core, another forming an ejector and a second quarter of the mold chamber, and a third coöperating with the other two sections and forming a half of the mold chamber to supplement the two quarter sections and complete the chamber.

2. In a casting machine, the combination of coöperating mold sections, one of said sections forming a core, another forming an ejector, and a third coöperating with the other two to inclose a mold chamber and a trough, with means for moving it toward and from the mold sections accordingly as the sections are closed or opened.

3. The combination in a casting machine, of a sectional mold, comprising a core member, a complementary mold section having limited movement independent of the core member, a second mold section coöperating with the core member and with the first-named section to inclose a mold chamber, and means for coördinating the movements of the sections so that in opening the mold the second-named section moves first to clear it of the cast, and subsequently, the first-named mold section moves to act as an ejector to the cast.

4. In a casting machine, the combination of a core member, a plurality of movable mold sections coöperating with the core member to inclose a mold chamber, means for giving the mold sections independent but coördinate movement in opening and closing, a water jacket in connection with the core member, and a hinged trough with means for giving it coördinate movement with the mold sections.

5. The combination in a casting machine, of a stationary mold section with matrix chambers, a plurality of movable mold sections coöperating with the stationary mold sections to complete the matrix chamber, an operating lever, means actuated by the lever for moving the movable mold sections into closed molding position, and a sprue trough movable by one of said mold sections through the instrumentality of said lever into and out of engagement with the sections.

6. The combination in a machine for casting tubular pieces, a stationary mold section with matrix chambers, a plurality of movable mold sections coöperating with the stationary mold sections to complete the matrix chamber, an operating lever, means actuated by the lever for moving the movable mold sections through the instrumentality of said lever, and a sprue trough operated by the lever to and from the mold sections, said sprue trough being slidably mounted to act shear fashion to sever the sprue material from the cast pieces in the matrices.

7. In a casting machine, the combination of a stationary mold section with a plurality of matrix cavities, complementary and independently movable mold sections closable to coöperate with the stationary section to complete the matrix chambers, a swingable trough with sprue holes, communicating with the matrix chambers, and a single operating lever whereby the several movable elements of the mold machine may be brought into casting position, and subsequently moved from casting position.

8. In a casting machine, the combination of a stationary mold section with a plurality of matrix cavities, complementary and independently movable mold sections closable to coöperate with the stationary section to complete the matrix chambers, a swingable trough with sprue holes, communicating with the matrix chambers, a single operating lever, and means connected to the lever and movable elements whereby the several movable elements of the mold machine may be brought into casting position, and eject the casting pieces from the matrix chamber.

9. In a casting machine, the combination with a stationary mold section having matrix cavities of core pins projecting into the cavities, relatively movable complementary mold sections each with cavities coöperating with those of the stationary mold sections to produce matrix cavities of a form to produce the cast pieces, and means for opening the mold sections by moving the movable sections successively in the same direction and in spaced relation to each other and to the stationary section.

10. In a casting machine, the combination with a stationary mold section having matrix cavities of core pins projecting into the cavities, complementary movable mold sections with cavities coöperating with the stationary mold sections to produce matrix cavities of a form to produce the cast pieces, means for opening and closing the mold sections in proper sequence, said means comprising a single hand lever and connections between said lever and the movable mold sections for moving the latter in predetermined order to closed and open positions.

11. In a casting machine, the combination with a stationary mold section having matrix cavities of core pins projecting into the cavities, complementary movable mold sections with cavities coöperating with the stationary mold sections to produce matrix cavities of a form to produce the cast pieces, means for opening and closing the mold sections in proper sequence, said means comprising a single hand lever and moving connections between said lever and the movable mold sections for moving the latter in predetermined order to closed and open positions, and a shearing device with sprue holes adapted to be moved into position to communicate with the matrix chambers when the mold sections are closed, said device being operable through the instrumentality of said lever.

12. In a casting machine, a stationary core element, a mold section movable longitudinally of the core element, a second mold section movable longitudinally of the core element and relative to the first mold section, and a trough operable by one of the mold sections subsequent to the initial movement of the last section.

13. In a casting machine, a stationary mold section having matrix cavities and core pins secured on the section and projecting across the cavities, movable mold sections having matrix cavities, the cavities of said sections coöperating to form a molding chamber, said core pins projecting from one end of the chamber to the other, so as to form a substantial tubular cast piece, said core pins being provided on one side with a longitudinally extending rib reaching to the bottom of the matrix chamber for the production of the longitudinal split, approximately cylindrical cast piece.

14. The combination in a casting machine of a plurality of chambered mold sections, means for relatively opening or closing the sections upon casting chambers, a trough with sprue holes registering with said chambers, said trough being movable to and from the mold sections by operative connection with one of said sections, and a single operating lever for actuating the several movable elements in predetermined time.

15. The combination in a machine for casting pieces, a relatively stationary mold section with matrix cavities, a plurality of movable mold sections, all of which coöperate to form when in closed position a multiplicity of casting chambers, an operating lever pivotally connected to one of the said mold sections for moving the same, and connecting means between the movable sections whereby one is permitted to move a predetermined distance without moving effect upon the other, and for subsequently moving the same.

16. The combination in a machine for casting pieces, a relatively stationary mold section with matrix cavities, a plurality of movable mold sections, all of which coöperate to form, when in closed position, a multiplicity of casting chambers, an operating lever pivotally connected to one of the said mold sections for moving the same, connecting means between the movable sections whereby one is permitted to move a predetermined distance without moving effect upon the other, and for subsequently moving the same, and a sprue trough movable to and from the closed position of the mold sections by one of said movable sections.

17. In a casting machine, a sectional mold including a movable section, a pouring trough mounted for movement to and from the mold by the movable section, and a connection between the trough and movable section adapted for moving the trough on movement of the mold section to open the mold and permitting of initial independent movement of the movable section relative to the trough to sever the cast material from the latter.

18. In a casting machine a stationary mold section, a slidable mold section movable toward and away from one end of the stationary section, and a second slidable mold section coöperating with the top of the stationary section and the inner end of the first named slidable section.

19. In combination with a stationary mold section, a pair of slidable mold sections which coöperate with the stationary section to form a molding chamber, and means to first slide one of the slidable sections away from the other two sections and to subsequently slide the third section.

20. In a casting machine, a sectional mold including a movable section, a rack connected to the latter, a pouring trough, and a movable support operably connected to the rack whereby on movement of the movable mold section the trough is moved to or from the mold.

21. In a casting machine, a sectional mold including a movable section, a swingingly mounted frame operable by the movable mold section, and a pouring trough bodily and movably supported on the swinging frame.

22. In combination with a mold having a movable section, a pouring trough overlying the mold, and means associated with the movable section and trough whereby said means will first relatively move the movable section and the mold so as to shear the cast and upon further and continued movement will move the trough away from the mold.

In testimony whereof I have hereunto set my hand in the presence of two subscribing witnesses.

ERIK MAUNULA.

Witnesses:
W. L. WARREN,
C. B. SACRY.